(12) United States Patent
Lovas et al.

(10) Patent No.: US 11,229,171 B2
(45) Date of Patent: Jan. 25, 2022

(54) METHODS OF CULTURING A FLOATING AQUATIC SPECIES USING AN APPARATUS FOR FLUID CONVEYANCE IN A CONTINUOUS LOOP

(71) Applicant: Parabel Ltd., Grand Cayman (KY)

(72) Inventors: Brian Lovas, Palm Bay, FL (US);
Hector Cumba, Palm Bay, FL (US);
Adam Javan, Melbourne, FL (US);
Harvey Weaver, Okeechobee, FL (US);
William Grieco, Melbourne, FL (US)

(73) Assignee: Parabel Nutrition, Inc., Vero Beach, FL (US)

( * ) Notice: Subject to any disclaimer, the term of this patent is extended or adjusted under 35 U.S.C. 154(b) by 331 days.

(21) Appl. No.: 16/565,204

(22) Filed: Sep. 9, 2019

(65) Prior Publication Data
US 2020/0000052 A1    Jan. 2, 2020

Related U.S. Application Data

(63) Continuation of application No. 15/898,315, filed on Feb. 16, 2018, now Pat. No. 10,405,506, which is a
(Continued)

(51) Int. Cl.
*A01G 33/00* (2006.01)
*A01K 63/04* (2006.01)
(Continued)

(52) U.S. Cl.
CPC ............. *A01G 33/00* (2013.01); *A01G 31/02* (2013.01); *A01K 63/047* (2013.01); *A01G 2031/006* (2013.01)

(58) Field of Classification Search
CPC ................................ A01G 33/00; A01G 31/02
See application file for complete search history.

(56) References Cited

U.S. PATENT DOCUMENTS

| | | | |
|---|---|---|---|
| 2,522,513 | A | 9/1950 | Hemmeter |
| 2,692,200 | A | 10/1954 | Olson |

(Continued)

FOREIGN PATENT DOCUMENTS

| | | |
|---|---|---|
| CN | 101116986 | 2/2008 |
| CN | 102448286 A | 9/2012 |

(Continued)

OTHER PUBLICATIONS

Office Action in Australian Patent Application No. 2016321414, dated Apr. 22, 2020.
(Continued)

*Primary Examiner* — Monica L Barlow
(74) *Attorney, Agent, or Firm* — Baker & McKenzie LLP

(57) ABSTRACT

The present disclosure relates to a method of culturing a floating aquatic species, the method including introducing the aquatic species into a receptacle having (a) a culture medium, (b) at least one raceway configured to allow the culture medium to flow in a continuous loop, and (c) a sufficient quantity of the culture medium to flow in the continuous loop; cultivating the aquatic species to generate a floating mat on a top surface of the culture medium; generating a fluid current of sufficient force to propel the floating mat on the top surface of the culture medium; and varying a velocity of the fluid current in a controlled manner to maintain a relatively uniform distribution of the floating mat on the top surface of the culture medium.

19 Claims, 10 Drawing Sheets

Related U.S. Application Data continuation-in-part of application No. 13/265,525, filed as application No. PCT/US2010/031811 on Apr. 20, 2010, now Pat. No. 9,894,856.

(60) Provisional application No. 61/171,036, filed on Apr. 20, 2009.

(51) Int. Cl.
*A01G 31/02* (2006.01)
*A01G 31/00* (2018.01)

(56) References Cited

U.S. PATENT DOCUMENTS

| | | | |
|---|---|---|---|
| 2,715,795 A * | 8/1955 | Pallotta | C12M 29/04 435/257.3 |
| 2,867,945 A | 1/1959 | Gotaas et al. | |
| 3,468,057 A | 9/1969 | Buisson | |
| 3,674,501 A | 7/1972 | Betz et al. | |
| 3,768,200 A | 10/1973 | Klock | |
| 3,839,198 A | 10/1974 | Shelef | |
| 3,955,318 A | 5/1976 | Hulls | |
| 4,005,546 A | 2/1977 | Oswald | |
| 4,041,640 A | 8/1977 | Itanami et al. | |
| 4,042,367 A | 8/1977 | Wilson | |
| 4,077,158 A | 3/1978 | England | |
| 4,137,868 A | 2/1979 | Pryor | |
| 4,209,943 A * | 7/1980 | Moeller | A01G 9/18 47/1.4 |
| 4,253,271 A | 3/1981 | Raymond | |
| 4,516,528 A | 5/1985 | Jones | |
| 4,910,912 A | 3/1990 | Lowrey, III | |
| 5,121,708 A | 6/1992 | Nuttle | |
| 5,269,819 A | 12/1993 | Porath | |
| 5,527,456 A | 6/1996 | Jensen | |
| 5,659,977 A | 8/1997 | Jensen et al. | |
| 5,941,165 A | 8/1999 | Butte | |
| 6,348,347 B1 | 2/2002 | Hirabayashi et al. | |
| 8,245,440 B2 | 8/2012 | Ryan et al. | |
| 8,287,740 B2 | 10/2012 | Newman et al. | |
| 8,415,142 B2 * | 4/2013 | Kertz | A01G 7/02 435/292.1 |
| 2004/0144025 A1 | 7/2004 | Rutzke | |
| 2007/0048859 A1 | 3/2007 | Sears | |
| 2007/0151522 A1 | 7/2007 | Brauman | |
| 2008/0155890 A1 | 7/2008 | Oyler | |
| 2009/0088757 A1 | 4/2009 | Tulkis | |
| 2010/0028505 A1 | 2/2010 | Katzke et al. | |
| 2010/0041095 A1 | 2/2010 | Zeikus | |
| 2010/0116986 A1 | 5/2010 | Obuki et al. | |
| 2010/0162620 A1 | 7/2010 | McCaffrey et al. | |
| 2010/0281836 A1 | 11/2010 | Koenraad et al. | |
| 2012/0110901 A1 | 5/2012 | Olivier et al. | |
| 2013/0023044 A1 | 1/2013 | Gleason | |
| 2013/0244309 A1 | 9/2013 | Singh et al. | |
| 2014/0221630 A1 | 8/2014 | Olivier et al. | |
| 2014/0356496 A1 | 12/2014 | Mulnyczuk | |

FOREIGN PATENT DOCUMENTS

| | | |
|---|---|---|
| CN | 103002752 A | 3/2013 |
| CN | 202960947 U | 6/2013 |
| CN | 104126494 | 11/2014 |
| CN | 104413257 | 3/2015 |
| CN | 104585067 A | 5/2015 |
| JP | S54147650 A | 11/1978 |
| JP | 54-73148 | 6/1979 |
| JP | S56-031425 | 3/1981 |
| JP | S59-183635 A | 10/1984 |
| JP | 2001-346544 | 12/2001 |
| JP | 2002-306147 A | 10/2002 |
| JP | 2002-532112 A | 10/2002 |
| JP | 2008-043207 A | 2/2008 |
| JP | 2010-214278 A | 9/2010 |
| JP | 2011-019508 A | 2/2011 |
| JP | 2011254724 A | 12/2011 |
| JP | 2013521808 A | 6/2013 |
| KR | 20000018164 U | 10/2000 |
| MX | 2011010995 A | 1/2012 |
| WO | 2002034755 | 5/2002 |
| WO | 2007109066 A1 | 9/2007 |
| WO | 2007111677 | 10/2007 |
| WO | 2010123943 A1 | 10/2010 |
| WO | 2011044194 A2 | 4/2011 |
| WO | 2011116252 | 9/2011 |
| WO | WO2011116252 | 9/2011 |
| WO | 2011-156662 A2 | 12/2011 |
| WO | 2014046543 | 3/2014 |

OTHER PUBLICATIONS

Office Action dated Jul. 3, 2020 in Chinese Application No. 201680047237.2.
Office Action dated Jul. 9, 2020 in Japanese Application No. 2018-516402.
Office Action dated Aug. 4, 2020 in Japanese Application No. 2018-506982.
Office Action dated Jun. 24, 2020 in European Application No. 16845295.1.
Office Action dated Jun. 23, 2020 in Japanese Application No. 2018-532531.
Annual Review of Plant Biology, 2005, vol. 56, p. 41-71.
Sogbesan et al, "Utilization of Treated Duckweed Meal (*Lemna pausicostata*) as Plant Protein Supplement in African Mud Catfish (*Clarias gariepinus*) Juvenile Diets", Fisheries and Aquaculture Journal, vol. 06, No. 04, Jul. 12, 2015, p. 1-5, XP055535965.
Examination Report dated Dec. 7, 2020 in European Patent Application No. 16845285.2.
Stuart L. Cantor: "New Plant Protein Powerhouses Prepared Foods", Sep. 11, 2015, XP055755579.
Titi Mutiara Kirana et al. "Effect of Blanching Treatments Against Protein Content and Amino Acid Drumstrick Leaves (*Moringa oleifera*)", Journal of Food Research, vol. 2, No. 1, Jan. 1, 2013, pp. 101-108, XP055367771.
Examination Report dated Dec. 17, 2020 in Australian Patent Application No. 2016321414.
Office Action dated Dec. 14, 2020 in Chinese Application No. 201680058494.6.
Office Action dated Sep. 2, 2020 in Chinese Application No. 201680047105.x.
Office Action dated Dec. 3, 2020 in Chinese Application No. 201680047175.5.
Kammerer, Dietmar Rolf, Chapter 11—Resin Adsorption and Ion Exchange to Recover and Fractionate Polyphenols, Polyphenols in Plants, 219-230.
Office Action dated Nov. 17, 2020 in Brazilian Patent Application No. BR112018004808-9 (agent's reporting letter).
Mazen, Ahmed M. A., et al. Calcium oxalate formation in Lemna minor: physiological and ultrastructural aspects of high capacity calcium sequestration. New Phytologist (2003), 435-448.
Extended European Search Report dated Feb. 26, 2021 in European Patent Application No. 20197495.3.
Office Action dated Nov. 12, 2020 in European Patent Application No. 16808482.0.
Office Action dated May 28, 2021 in Australian Patent Application No. 2016276972.
Notice of Acceptance dated May 12, 2021 in Australian Patent Application No. 2016321425.
Office Action dated May 24, 2021 in Australian Patent Application No. 2020201808.
Office Action dated Jun. 18, 2021 in Chinese Patent Application No. 201680065224.8.
Office Action dated Apr. 27, 2021 in Japanese Patent Application No. 2018-532528.
Office Action from SIPO dated Apr. 26, 2019 in Chinese Patent Application No. 201610789415.0.

(56) References Cited

OTHER PUBLICATIONS

Pedroni et al., A Proposal to Establish International Network on Biofixation of C02 and Greenhouse Gas Abatement with Microalgae, Journal of Energy and Environmental Research, vol. 1, No. 1, Nov. 2001.
http://www.aquaponics.net.au/sites1 0.html, Murray Hallam, Practical Aquaponics for Everyone, Wayback Machine Dec. 2008, 3 pages.
Https://jeremybiggs.wordpress.com/2008/1 0/28/duck-attack/, The Garden Pond Blog, Oct. 2008, 2 pages.
http://collections.infocollections.org/ukedu/en/d/Jii23we/9.1.html, Workshop to produce an Information Kit on Farmer-proven integrated agriculture-aquaculture technologies, IIRR; 1992, 10 pages.
Examination Report, mailed in related Chinese Patent Application No. 201080023569.X, dated Sep. 20, 2012.
Office Action, mailed in related Brazilian Patent Application No. PI1015000-5, notification published Jan. 23, 2018.
Office Action mailed in related Malaysian Patent Application No. PI 2011005000, dated Jun. 30, 2015.
International Search Report and Written Opinion of the International Searching Authority (US) in related International Application No. PCT/US2010/031811, dated Jun. 18, 2010.
International Preliminary Report on Patentability of the International Preliminary Examination Authority (US) in related International Application No. PCT/US2010/031811, dated Oct. 11, 2011.
Office Action received in Brazilian Patent Application No. PI1015000-5, dated May 10, 2018.
Lentein, "Clean. Green. Protein", Retrieved from: https://web.archive.org/web/20150901074209/https://lentein.com, web accessed on Jul. 17, 2020.
Lentein, "Green Protein Powder", Retrieved from: https://web.archive.org/web/20150822012645/https://lentein.com/lentein-plus-powder, web accessed on Jul. 17, 2020.
Office Action, mailed in Japanese Patent Application No. 2018-516396, dated Jun. 2, 2020.
Office Action, mailed in Japanese Patent Application No. 2018-516401, dated Jun. 2, 2020.
Office Action, mailed in Japanese Patent Application No. 2018-532528, dated Jun. 23, 2020.
Fasakin, EA "Nutrient quality of leaf protein concentrates produced from water fern (*Azolla africanna* Oesv) and Duckweed (*Spirodela polyrrhiza* L. *Schleiden*)", Bioresource Technology., vol. 69, No. 2, Aug. 1, 1999 (Aug. 1, 1999), pp. 185-187.
Office Action dated Nov. 13, 2019 in European Patent Application No. 16808454.9.

\* cited by examiner

DETAIL A
SCALE 1 / 125
Paddlewheels & Support Platforms

DETAIL B
SCALE 1 / 125
Drain Sumps

DETAIL C
SCALE 1 / 75
Floating Windbreaks

DETAIL D
SCALE 1 / 75
Floating Harvesting Skimmer

DETAIL E
SCALE 1/75
Harvesting Transfer Moat &
Harvesting Conveyor Belt

METHODS OF CULTURING A FLOATING AQUATIC SPECIES USING AN APPARATUS FOR FLUID CONVEYANCE IN A CONTINUOUS LOOP

CROSS-REFERENCE TO RELATED APPLICATIONS

This application claims priority to and is a continuation of U.S. application Ser. No. 15/898,315 filed on Feb. 16, 2018, which claims priority to and is a continuation-in-part of U.S. application Ser. No. 13/265,525 filed on Feb. 6, 2012, which claims priority to and is a U.S. National Stage Entry of International Application No. PCT/US2010/031811, filed on Apr. 20, 2010, which claims priority to and benefit of U.S. Provisional Application No. 61/171,036 filed on Apr. 20, 2009, the contents of all of which are hereby incorporated by reference in their entirety.

FIELD OF THE DISCLOSURE

The present invention relates generally to the cultivation and processing of small aquatic photosynthetic organisms such as algae, aquatic species, and the like, including the small aquatic plant floating aquatic species such as duckweeds.

BACKGROUND OF THE DISCLOSURE

Existing forms of fluid conveyance may not be appropriate for or optimized for controlling distribution of objects floating on the surface of the conveyed fluid.

SUMMARY

Accordingly, a need has arisen for improved fluid conveyance apparatuses. The present disclosure relates, according to some embodiments, to a fluid conveyance apparatus. An apparatus may comprise a receptacle. A receptacle may comprise at least one raceway. A receptacle may be configured to allow a culture medium to flow in a continuous loop. An apparatus may comprise a propulsion mechanism. A propulsion mechanism may be configured to generate a fluid current of sufficient force to propel a floating mat on a top surface of a culture medium. A propulsion mechanism may be configured to vary a velocity of a fluid current in a controlled manner to maintain a relatively uniform distribution of a floating mat on the top surface of a culture medium. An apparatus may comprise a control mechanism. A control mechanism may be operatively linked to a propulsion mechanism and may be configured to regulate the velocity of the fluid current.

Moreover, the present disclosure relates to a method of culturing a floating aquatic species, the method including introducing the aquatic species into a receptacle having (a) a culture medium, (b) at least one raceway configured to allow the culture medium to flow in a continuous loop, and (c) a sufficient quantity of the culture medium to flow in the continuous loop; cultivating the aquatic species to generate a floating mat on a top surface of the culture medium; generating a fluid current of sufficient force to propel the floating mat on the top surface of the culture medium; and varying a velocity of the fluid current in a controlled manner to maintain a relatively uniform distribution of the floating mat on the top surface of the culture medium.

A method may further include harvesting an aquatic species with a harvest system (e.g., a conveyer belt and a surface skimmer). In some embodiments harvesting an aquatic species with a harvest system may include: coupling the harvest system (e.g., a conveyor belt and a harvest channel wall) to a propulsion system (e.g., a paddle wheel); generating a channel between the propulsion system and the harvest system; and directing at least a portion of a floating mat of the floating aquatic species through the channel.

In some embodiments, a method may include monitoring at least one of: (a) a uniformity of distribution of a floating mat across a top surface of a culture medium, (b) a thickness of the floating mat (c) a density of the floating mat, (d) a pH of the culture medium, (e) a concentration of carbon dioxide in the culture medium, and (f) a concentration of one or more nutrients in the culture medium. Monitoring may be performed by a sensor and the method may include: collecting a data point about a monitored metric; generating a sensor signal comprising the data point; and transmitting the sensor signal (e.g., to a control mechanism). Further, a method may include a control mechanism, operatively linked to a sensor and at least one regulator (e.g., a propulsion mechanism, a harvest system, a sprinkler system, an additive source), receiving the sensor signal. After receiving the sensor signal, a method may further include determining if a threshold level of a monitored metric is reached; generating a regulation signal in response to the threshold level of the monitored metric being reached; and transmitting the regulation signal. The method may include, in some embodiments, a regulator (e.g., a propulsion mechanism, a harvest system, a sprinkler system, an additive source) receiving the regulation signal and performing a regulatory function in response to the regulation signal (e.g., a propulsion mechanism changes the velocity of the fluid current, a harvesting system is activated, an additive source dispenses additional nutrients and/or salts into the culture medium).

BRIEF DESCRIPTION OF THE DRAWINGS

Some embodiments of the disclosure may be understood by referring, in part, to the present disclosure and the accompanying drawings, wherein.

DETAILED DESCRIPTION

Aquatic species, such as, for example, duckweed, watermeal, mosquito fern, salvinia, water lettuce, and the like, due to their high cellulose and hemicellulose contents, can be processed to generate fuel and high value chemicals and materials. Processing of aquatic species can be accomplished by a range of methods or combinations of methods depending upon the desired end products and/or intermediates.

Lemnaceae is a family of flowering plants, also known as the duckweed family, as it contains the duckweeds or water lentils. Duckweeds include the genera *Spirodela, Landoltia, Lemna, Wolffia,* and *Wolfiella*. Duckweeds are fast-growing, high-protein-yielding, and high pigment-containing monocotyledonous plants and are classified as macrophytes. There are greater than forty species of duckweed worldwide, but they are most abundantly found in moderate climates of tropical temperate zones. When confronted with temperatures below about twenty degrees Celsius, duckweed plants form a non-buoyant structure called a turion, which sinks to the bottom of the pond and remains dormant until warmer conditions return.

Duckweed is an important food source for waterfowl and is eaten by humans in some parts of Southeast Asia. Duckweed additionally provides shelter for a number of water species, such as frogs and fish, while simultaneously aiding in bioremediation of its native environment by absorbing excess mineral nutrients, particularly nitrogen and phosphates. Duckweed grown on sewage or animal wastes normally does not contain toxic pollutants and can be fed to fish or to livestock, or spread on farmland as fertilizer. However, duckweed that is to be used for human or animal consumption involves a retention period in clean water to ensure that the biomass is free of water-borne pathogens. Duckweed and lemna are used interchangeably in the application. Existing forms of fluid conveyance may not be appropriate for or optimized for controlling distribution of objects (e.g., duckweed) floating on the surface of the conveyed fluid.

Figure 1:
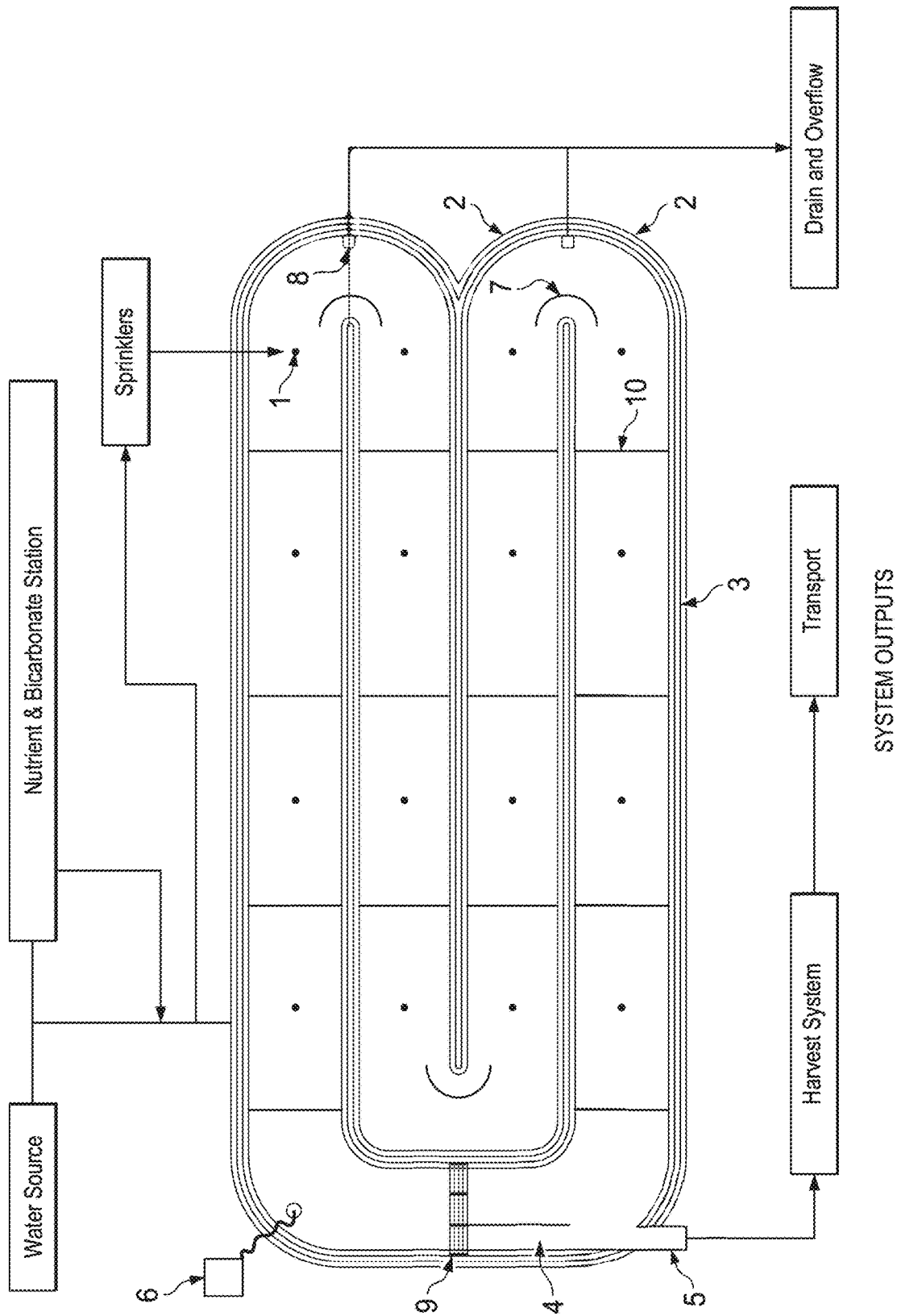
FIG. 1 illustrates a perspective of a system for fluid conveyance in a continuous loop according to specific example embodiments of the disclosure.

In particular embodiments, a serpentine raceway growth system (or single raceways) is provided that comprises a plastic lined shallow pond with dividing walls or meandering channels. It has a propulsion system comprising a shaft paddle wheel to move the water along with the floating microcrop to an in-situ harvest point as shown in FIG. 1. The raceways are engineered or configured for recycling the culture medium (also referred to as liquid for simplicity), and varying liquid flow rates in a controlled manner to maintain uniform Lemna distribution throughout the productivity area. As the microcrop grows it can develop a floating mat on the water's surface which can get thicker. This thickness can be closely monitored by aerial photo images and sensors located in strategic areas in the raceways. Systems and methods for carrying out such imaging are disclosed in U.S. Provisional Application No. 61/186, 349 entitled "Vegetation Indices for Measuring Multilayer Microcrop Density and Growth," filed on Jun. 11, 2009, which is incorporated by reference in its entirety into the present application. In particular embodiments, strategic areas include areas of the productivity area that are representative of the growth of the microcrop in the growth system. In such embodiments, for example, areas where the floating mat of the microcrop tends to pile up or thicken greatly, or areas where there is little micro crop as a result of the local configuration of the growth system, would not be selected as strategic areas for the placement of sensors or for aerial imaging. The automated harvest system can receive feedback from these sensors to regulate the frequency and amount of harvested Lemna. This automatic process can help maintain the productivity of the Lemna under optimum growth rate conditions.

In this embodiment, the raceway growth system is a modular design containing four joined serpentine raceways or four single raceways. In a particular embodiment, the footprint area for a single raceway is about 2.50 hectares (hereinafter referred to as ha) and about 10 ha per module. In this embodiment, a single raceway measures about 518 m long with four channels each about 12 m wide and with an operational volume of about 7,620 m3 at a water depth of about 30 cm. The perimeter and central dividing walls (or "berms") are formed using compacted dirt removed during earth work. In a specific implementation of this embodiment, a plastic 30 mil (i.e., about 0.76 mm thickness) high density polyethylene (HDPE) liner covers the flat bottom and sloping side walls to protect the liquid culture contacting the ground elements, extending the life of the berms from wave action. Also the liner helps avoid water losses via seepage and groundwater contamination. As used herein, "about" indicates ±20% variation of the value it describes. It is understood that the specific dimensions described herein are for illustration purposes and are not intended to limit the scope of the application. Merely by way of example, a single raceway can be at least about 0.5 ha, or at least about 1 ha, or at least 1.5 ha, or at least about 2 ha, or at least about 2.5 ha, or at least about 3 ha, or at least about 3.5 ha, or at least about 4 ha, or at least about 4.5 ha, or at least about 5 ha, or at least 5.5 ha, or at least about 6 ha, or at least about 6.5 ha, or at least about 7 ha, or at least about 7.5 ha, or at least about 8 ha, or at least about 8.5 ha, or at least about 9 ha, or at least about 9.5 ha, or at least about 10 ha. A single raceway can be smaller than about 50 ha, or smaller than about 40 ha, or smaller than about 30 ha, or smaller than about 25 ha, or smaller than about 20 ha, or smaller than about 15 ha, or smaller than about 10 ha, or smaller than about 8 ha, or smaller than about 6 ha, or smaller than about 5 ha, or smaller than about 4 ha, or smaller than about 3 ha, or smaller than about 2 ha, or smaller than about 1 ha. A single raceway can measure at least 10 meters long, or at least 20 meters long, or at least 50 meters long, or at least 100 meters long, or at least 150 meters long, or at least 200 meters long, or at least 250 meters long, or at least 300 meters long, or at least 350 meters long, or at least 400 meters long, or at least 450 meters long, or at least 500 meters long, or at least 550 meters long, or at least 600 meters long, or at least 650 meters long, or at least 700 meters long, or at least 750 meters long, or at least 800 meters long. A single raceway can include 1, 2, 3, 4, 5, 6, 7, 8, 9, 10 or more than 10 channels. Each channel can be from about 0.5 meters to about 50 meters, or from about 1 meter to about 40 meters, or from about 2 meters to about 30 meters, or from about 3 meters to about 30 meters, or from about 4 meters to about 25 meters, or from about 5 meters to about 20 meters, or from about 6 meters to about 18 meters, or from about 7 meters to about 15 meters, or from about 8 meters to about 15 meters, or from about 9 meters to about 12 meters. The water depth in a single raceway can be from about 1 centimeter to about 100 centimeters, or from about 2 centimeters to about 80 centimeters, or from about 5 centimeters to about 70 centimeters, or from about 8 centimeters to about 60 centimeters, or from about 10 centimeters to about 50 centimeters, or from about 15 centimeters to about 40 centimeters, or from about 20 centimeters to about 30 centimeters. The water depth in a single raceway can be less than about 200 centimeters, or less than about 180 centimeters, or less than about 150 centimeters, or less than about 120 centimeters, or less than about 100 centimeters, or less than about 90 centimeters, or less than about 80 centimeters, or less than about 70 centimeters, or less than about 60 centimeters, or less than about 50 centimeters, or less than about 40 centimeters, or less than about 30 centimeters. A module can include 1, 2, 3, 4, 5, 6, 7, 8, 9, 10 or more than 10 single raceways.

Ground water, surface water, and reused water are acceptable for the growth of the Lemna as long as they meet biological and chemical growth criteria. A series of treatment ponds with floating aerators and in line UV light can help condition the water for proper reuse in the growth ponds. Water quality sensors on the discharge water pipeline can control the treatment process and monitor the water quality.

Raceway Components

A preferred embodiment of the invention provides an apparatus for culturing aquatic species comprising: a container configured to contain the aquatic species in sufficient culture medium to permit normal growth of the aquatic species, wherein the container has a configuration allowing the culture medium to flow in a continuous loop; a propulsion mechanism configured to apply sufficient force to the culture medium to cause motion thereof; and an automated harvest system configured to permit harvest of the aquatic species without ceasing the motion. Another embodiment of the present invention provides an apparatus for culturing aquatic species comprising: a container configured to contain the aquatic species in sufficient culture medium to permit normal growth of the aquatic species, wherein the container is divided into growth cells by dividers; a wind barrier apparatus mounted on at least some of the dividers and configured to reduce a force applied to the aquatic species by wind; and an automated harvest system configured to permit harvest of the aquatic species. In a further aspect of either embodiment, the container is configured to permit ambient light to reach the aquatic species. In a further aspect of either embodiment, the container is open at the top thereof. In a further aspect of either embodiment, the container is configured to permit a culture medium depth within a range of approximately 10 to approximately 50 cm. In a further aspect of either embodiment, the container comprises a plastic-lined pond. In a further aspect, the harvest system comprises a conveyor belt configured to be movable into the culture medium, whereby a portion of the aquatic species is removed from the container. In a further aspect, the harvest system comprises a mechanism for recycling culture medium to the container. In a further aspect, the apparatus additionally comprises a sprinkler system configured to apply a mist of an aqueous solution across the width of the container.

In a further aspect, the apparatus additionally comprises a nutrient tank in fluid communication with the container, wherein the physical value is the level of a nutrient within the culture medium, and the action is dispensing the nutrient to the culture medium. In a further aspect, the nutrient is selected from the group consisting of nitrogen, phosphorous, potassium, carbon dioxide, and a micronutrient. In a further aspect, the physical value is pH, and the action is the addition of an alkaline salt to the culture medium. In a further aspect, the apparatus additionally comprises a sensor configured to monitor a physical value within the culture medium and to indicate a need to take an action when the physical value is outside preset parameters.

A preferred embodiment of the invention provides a method of culturing an aquatic species, comprising: providing an apparatus; placing a culture medium within the container; introducing the aquatic species into the culture medium; and harvesting the aquatic species. In a further aspect, the culture medium is selected from the group consisting of fresh water, brackish water, and saline water. Some embodiments include a method of culturing floating aquatic species comprising: providing water from a water source, the water being substantially free of toxic heavy metals; providing light; culturing at least one aquatic species in a containment area comprising the water; and harvesting the aquatic species. The aquatic species can be duckweed. In a further aspect of either embodiment, the aquatic species is selected from the group of genera consisting of *Spirodela, Landoltia, Lemna, Wolffia*, and *Wolfiella*. The harvesting step can be done when a density of the aquatic species is at an optimum harvest density. The water can be fresh, brackish, or saline. In embodiments with brackish or saline water, the floating aquatic species can be a salt-tolerate species. The harvested aquatic culture can be processed to extract protein and/or the biomass can be used for fermentation into alcohol, pyrolysis into high value fuels, or combustion for energy.

In some embodiments, A fluid conveyance apparatus may comprise a receptacle comprising at least one raceway and configured to allow a culture medium to flow in a continuous loop. An apparatus may comprise a propulsion mechanism, which may be configured to generate a fluid current of sufficient force to propel a floating mat on a top surface of a culture medium, and to vary a velocity of the fluid current in a controlled manner to maintain a relatively uniform distribution of the floating mat on the top surface of the culture medium. An apparatus may comprise a control mechanism operatively linked to a propulsion mechanism and configured to regulate the velocity of a fluid current. A propulsion mechanism may be selected from a group consisting of a paddle wheel and a pump educator. A harvest system may comprise a conveyor belt or a surface skimmer. A harvest system may comprise a conveyor belt and a harvest channel wall, wherein the harvest channel wall is configured to extend from a paddle wheel such that a channel is generated between the paddle wheel and the conveyor belt, wherein the harvest channel is configured to direct at least a portion of a floating mat to the conveyor belt. A fluid conveyor apparatus may comprise a sensor operatively linked to a control mechanism. A sensor may be configured to monitor a uniformity of distribution of a floating mat across the top surface of a culture medium, a thickness of the floating mat, a pH of the culture medium, a concentration of carbon dioxide in the culture medium, and a concentration of one or more nutrients in the culture medium. A harvest system may be operatively linked to a control mechanism, wherein the harvest system may be configured to receive a signal from the control mechanism to activate the harvest system. A control mechanism may be configured to receive a signal from a sensor when a threshold level of the monitored metric is detected.

Paddle Wheel

The raceway contains a propulsion mechanism to cause the aqueous culture medium to move along with the cultured microcrop. In a particular embodiment, the mechanism comprises a paddle wheel that comprises three metal wheels each about 3.8 m long by about 1.82 min diameter. Each wheel has eight galvanized blades, about 3.8 m long by about 41 cm and attached to a main about 15.24 cm shaft by a series of metal angular. The blades have a clearance of about 2.54 cm on the sides and bottom to improve water circulation. An about 1 HP (horse power) motor connected to a 500:1 gear box provides the power to the paddle wheels and the speed is controlled via a Variable Frequency Drives (VFD) connected to a Programmable Logic Controller (PLC). The velocity of the paddle wheel varies from about 0 rpm to about 2 rpm to provide gentle Lemna movement on the water surface from 0 m/s to 0.3 m/s, and more preferably within a range of 0.01 m/s to 0.10 m/s. The velocity will be a function of operational conditions such as harvest and addition of nutrients, as well as weather parameters such as wind and solar radiation. The control of the paddle wheel is via Human-Machine Interface (HMI) connected to the PLC. In a specific embodiment, the HMI comprises a series of displays that aggregate data received from the PLC and show the operation of the system. The water velocity in all raceways has a default diurnal operational speed of about 0.05 m/s.

Pump Eductor

In an alternative embodiment, the propulsion mechanism comprises pump eductors that are located under the water along the width of the channel. In a specific embodiment, upstream water is pumped with an about 4 HP high pressure centrifugal pump to a common manifold containing about 20, about 9.5 mm eductors evenly spaced. To control the water velocity, a butterfly valve connected to the PLC and control by a pressure transducer on the pump discharge regulates the water flow and pressure at the eductors.

Windbreak Curtains

A floating wind curtain or windbreak curtain may be configured to reduce a wind force applied to the floating mat on the top surface of a culture medium by an atmospheric wind. In particular embodiments, knitted plastic mesh can be used as windbreak curtains to prevent compaction of the Lemna due to high winds. The plastic mesh can have about 50% porosity openings to reduce the wind turbulence and to allow light penetration. The windbreak curtains can have a height of about 76 cm and they are installed on top of the perimeter and central dividing walls. The curtains are attached to three about 12.5 ga cables which are supported on galvanized T-posts located about every 6 meters.

Windbreak curtains are also installed on floating structures to reduce the winds parallel to the raceway channels. Here, solid curtains made of the same plastic liner (30 mil HDPE) can be attached to a rectangular PVC pipe frame which is mounted on top of four PVC floating cylinders. The curtains measure about 76 cm by about 12 m with an air gap at the bottom of about 5 cm from the water level. The about 5 cm gap can allow a portion of the air to flow under the curtain and will help reduce the wind vortex downstream. This can allow more distance between the installations of the curtains. The floating curtains can be attached to two under water cables that extend the same length of the raceway channels.

In a further aspect of the former embodiment, the container comprises peripheral walls, and the apparatus additionally comprises a wind barrier apparatus mounted on at least some of the peripheral walls and configured to reduce a force applied to the aquatic species by wind. A wind barrier may be mounted on a peripheral wall of a receptacle and may be configured to reduce a wind force applied to a floating mat on the top surface of a culture medium by an atmospheric wind. In a further aspect, the wind barrier apparatus comprises a mesh curtain having a height within a range of approximately 50-100 cm. A mesh curtain may have a height of about 50 to about 100 cm. In a further aspect, the height is within a range of 70-80 cm. In a further aspect, the curtain comprises knitted plastic. In a further aspect, the propulsion mechanism is selected from the group consisting of a paddle wheel and a pump eductor. In a further aspect, the propulsion mechanism is a paddle wheel, and the apparatus additionally comprises a control mechanism configured to control the rotational speed of the propulsion mechanism within a range of from approximately 0 rpm to approximately 2 rpm. In a further aspect, the motion is within a range of 0.01-0.10 m/s.

Nutrient System

A special blend of fertilizers with the right amount and ratio of Nitrogen, Phosphorus, and Potassium as well as micro nutrients can be maintained at high concentration in the nutrient tanks. Sensors located in each module can monitor the level of nutrients and can control the dosing of nutrients via the HMI. Each nutrient station can have a concentrated nutrient tank connected to a dosing posing pump. When the level of a nutrient is below the set point in the HMI, the dosing pump is activated and will add concentrated nutrient to each raceway in each module at strategic locations to maintain uniform levels throughout the raceways. Depending on the dosing amounts and growth seasons, nutrients can be added via the underwater pipes or sprinkler system.

Another parameter that can be closely monitored and controlled in the growth reactors is the pH and/or the carbon dioxide concentration. As with the nutrient system, each module can have at least one pH sensor and/or at least one carbon dioxide sensor. A pH sensor and/or a carbon dioxide sensor can be used in tandem to indicate the need for adjustment by the addition of carbon dioxide in the liquid or gas phase and an alkaline salt such as sodium bicarbonate. The supply for carbon dioxide can be a commercial carbon dioxide pure gas, a blend and readily available flue gas.

Sprinkler Systems

An apparatus may comprise a sprinkler system. Sprinklers can be installed on the channels to cool down the Lemna to avoid excessive heating during hot weather. When the air temperature is high, the water sprinklers can turn on to distribute an even water mist across the width of the channel. Because the Lemna in the channel are constantly moving, the entire Lemna mat surface can receive a water mist. The sprinkler system can also be used to compensate for water lost during evaporation, growth and harvest. As mentioned above, the nutrient system can also be connected to the sprinkler line as an option to add nutrients over the mat surface evenly. The sprinkler system can be controlled by electric solenoid valves connected to the PLC; in a specific embodiment, these valves are about 2.5 cm in diameter. A sprinkler system may be operatively linked to a control mechanism.

Inoculation

In a particular embodiment, once the raceways have been set up with the operational water depth and nutrients, fresh acclimated wet Lemna is brought in from inoculation ponds located nearby the production raceways. An inoculation density of 600 g/m² will be used to estimate the mass of Lemna manually placed on each raceway. As the Lemna starts growing in the raceways, a portion is manually transferred to adjacent raceways and the process is repeated until all raceways are completely inoculated.

Utility Supply Line

In an embodiment, the main supply line for water, nutrients, and electricity is located between the modules to facilitate the installation and distribution to each raceway. Each module has a supply matrix with connections for water, nutrient, and sensors for monitoring raceway performance. Electrical solenoid valves can control the addition of water and nutrients to the raceways. In a particular embodiment, all solenoid valves are rated 24 V dc with a minimum CV of 22 to avoid high pressure losses. In this embodiment, the main distribution pipe diameter for the water and nutrient headers are about 250 mm and about 110 mm, respectively. The diameter for the supply branches for the water, nutrient, and sprinkler pipes are about 160 mm, about 25 mm, and about 110 mm, respectively.

Drain and Overflow

In a specific embodiment, each 2.5 ha raceway has two drain sumps and two emergency spillways on top of the berm for excess water overflow. In this embodiment, each drain box measures about 1.5 m about 1.5 m and is connected to an about 200 mm drain pipe. A pneumatic knife drain valve can control the gravity flow to a common canal. This canal can be located at the end of the raceways and it can also serve the emergency overflow. Water from the canal can drain by gravity to an earthen pond where it can be stored and treated for further reuse in the growth reactors.

Harvest System (Conveyor Belt)

A bioreactor system, in some embodiments, may monitor and adjust a thickness and distribution of a microcrop mat. For example, when a microcrop reaches a specified thickness or distribution a bioreactor system may initiate harvest procedures. In some embodiments, a minimum thickness of a microcrop mat may be maintained such that a desired evapotranspiration rate of a growth medium within a bioreactor system may be maintained. A minimum thickness of a microcrop may be maintained, in some embodiments, such that less sunlight is capable of penetrating a surface of a growth medium (i.e., reducing a growth potential of submerged aquatic species such as algae).

In a particular embodiment of the harvest system, an aerial photo scan and a local sensor located on the raceway monitor the thickness of the floating mat and activate the harvest process. An about 13 m harvest channel wall extends from the end of the first section of the paddle wheel pushing the Lemna mat towards the conveyor belt. During harvest, the speed of the water increases to 0.1 m/s to reduce the harvest operation time. A control mechanism may be configured to regulate the velocity of a fluid current such that a floating mat on the top surface of a culture medium is propelled at a speed of between 0.01 m/s and 0.10 m/s. A conveyor belt located at the end of the wall is automatically lowered into the water below the Lemna mat. The Lemna mat flows through about 11 m of the harvest channel in which section of the channel two mechanical arms funnel the Lemna to the conveyor belt. The remaining Lemna flows through the other 2 sections of the paddle wheel allowing the Lemna to evenly redistribute itself. The conveyor belt collects the floating Lemna mat and transports the Lemna to a shared screw auger that transfers all the Lemna from two adjacent raceways to a collection wagon. Excess water drained from the belt and auger is collected and drained back into the raceways. An automated system and a series of algorithms on the PLC can synchronize the speed of the belt and paddlewheel rotation to control the harvest rate and frequency. When the harvest amount is collected, a weight sensor located on the collection wagon communicates with the harvest system to stop harvesting and to bring the paddle wheel speed to normal operational mode. The tractor operator receives a signal when a wagon is full and ready to transport the dewatered Lemna biomass to the process building for the bioconversion process.

Harvest System (Skimmer)

In another embodiment of the harvest system, an aerial photo scan and a local sensor located on the raceway monitor the thickness of the floating mat and activate the harvest process. In a further aspect, the harvest system comprises a surface skimmer mechanism. In a further aspect, the apparatus additionally comprises a sensor configured to monitor the thickness of a floating mat of the aquatic species and to indicate a need to engage the harvest system when the mat reaches a preset thickness; and harvesting the aquatic species comprises engaging the harvest system in response to the signal. An about 13 m long harvest channel wall extends from the end of the first section of paddle wheel pushing the Lemna mat towards a harvest skimmer. The Lemna mat flows through about 11 m of the harvest channel width, in which section of the channel two mechanical arms funnel the Lemna down to a channel width of about 2.75 m, at which width a surface skimmer is located. During harvest the skimmer is positioned so that the top 2.54 cm is skimmed and the rest of the water flow travels under the skimmer and back into the normal flow of the raceway. The harvest skimmer is about 2.75 m wide by about 61 cm deep made from aluminum sheeting, polyvinyl chloride (PVC) and Styrofoam insulation. Each skimmer has six about 46 mm wide funnels that bring the Lemna to a about 127 mm×about 76 mm PVC reducing coupling. The skimmer is designed in a way that can optimize the percent solids harvested, minimizing the mass of water that needs to be processed. This is done by skimming the water twice, once at the front of the skimmer using the aluminum plate and again at the raised edge of the PVC coupling. A slotted about 12 mm PVC pipe is mounted at the front aluminum plate, and engages with the edge of the plate, preventing the skimming action from sucking sub-surface water. The six PVC couplings are then attached to a common drain pipe via a pipe having an inner diameter of about 110 mm Opening an automated knife on the drain pipe starts the skimming process. The common drain transports the Lemna and water mix out of the raceway via gravity to a common open channel which is connected to all raceways in the module. The Lemna water mix from all raceways is collected and removed by a single conveyor belt. The conveyor belt dumps the Lemna into a wagon which transports the Lemna to the process area. The water is then pumped back into the raceway at the same rate at which the water is being skimmed from the raceway. This is done via level switches connected to PLCs. When harvesting is completed the return pump is shut off and the knife valve closes, stopping the skimming process and filling the skimmer with water. The skimmer is then pulled to the bottom of the raceway to allow Lemna to flow through for normal growing operation. The common drain transports the Lemna and water mix out of the raceway via gravity to a common open channel which is connected to all raceways in the module. By gravity, the water and floating Lemna in the open channel then flows into a harvest sump. The sump has a receiving section for the Lemna and an overflow section for the water. A conveyor belt located in the receiving section collects the Lemna and transports it to a wagon. An about 50 HP high volume pump transfers the water back into the raceways. This pump is also used to push any remaining Lemna on to the conveyor belt. The skimmers, drain knife valve, conveyor belt, and return pump are all connected to the PLC to control the harvest operation. Weight sensors located in each wagon communicate with the PLC to stop the harvest process. When harvesting is completed the return pump is shut off and the knife valve closes stopping the skimming process and filling the skimmer with water. The skimmer is then pulled to the bottom of the raceway to allow the Lemna to flow through for normal growing operation.

In particular embodiments, the growth performance of the Lemna is maintained at optimum conditions via a series of sensors that monitor the pH, temperature, ammonia, and weather parameters. All the monitoring information is fed to a central human machine interface that controls the growth and harvest process. A sophisticated computer model predicts any growth problems and alerts operators to proceed with preventive actions to minimize down time periods.

The raceway system described above offers particular advantages. The raceway systems combine a dynamic and static hydraulic option that allows the water and Lemna to move very gently to a single harvest point. The motion of the water and Lemna can help maintain homogenous nutrient and temperature distribution throughout the floating Lemna mat and water interface. This can help reduce the nutrient boundary between the Lemna roots and the water. Another advantage of low velocity is to help maintain the Lemna mat uniformly on the surface, especially redistribution during windy conditions. The paddle wheel system is an effective and economical form of moving a large volume of water in a closed loop with low power consumption. Since the Lemna moves, a single harvest point can be strategically installed in the raceways so that a small amount of power is used to collect and transfer the Lemna (not the water) to a collection point.

Static Floating Grid Bioreactor

The floating grid system is a static design in which the Lemna is contained in floating cells with curtains to avoid Lemna compaction due to wind and wave action. In a particular embodiment, each cell measures about 6 m×about 6 m with a plastic curtain that can extend about 30 cm from the top of the water. High capacity pumps can be used to recirculate the liquid and to add the nutrients via a submerged array of pipes that extends throughout the bottom of the ponds. In such an embodiment, more power is employed to maintain uniform nutrients and temperature distribution. The harvest process can be performed by installing a skimmer funnel in each cell, about 44 skimmers per ha. The skimmer funnels are suspended from the intersection of four cells such that the rim of the skimmer will remain submerged at about 2.5 cm regardless of any change in liquid level. During harvest, the floating Lemna and water can be sucked through four skimmers at a rate of about 160 gpm for about 30 min and can be transferred to a dewatering station where a vibrating screen separates Lemna from the water. The water can be then pumped back with another high capacity pump into the production pond. Since only about 1% of Lemna is contained in the about 160 gpm, large volumes of water and energy can be used during the harvest process. The Lemna mat uniformity among all the cells can be different as a result of the difference in suction rate caused by the wind, Lemna mat thickness, and redistribution.

As used herein, "biomass" is a mass with a substantial carbon content. Biomass can include or be derived from algae; aquatic species such as, for example, duckweed; certain plastics or other organic wastes; conventional feedstock for pyrolysis in oil refinery; agricultural wastes or by-products such as, for example, silage, manure, and the like; or a mixture of some or all of the materials mentioned above.

Embodiments of the invention include methods of growing floating aquatic species that can be useful as fuel, food, fertilizer, and/or for bioremediation. Certain embodiments provide methods for extruding proteins from wet biomass without corresponding loss of carbohydrates.

In some embodiments, the floating aquatic species are grown as a substantial monoculture. In other embodiments the floating aquatic species are grown in a mixed culture with other plants. In still other embodiments, floating aquatic species are grown as part of a complex ecosystem that comprises one or more additional animal, plant or protist. In yet another embodiment, floating aquatic species are grown in an axenic culture.

In some embodiments, the floating aquatic species are grown in direct exposure to sunlight. In other embodiments the floating aquatic species are grown in indirect light. Other conditions can be selected and/or varied to support rapid growth, desirable protein profiles and/or carbohydrate production, and the like. Among these are the factors listed in Table 1.

In some embodiments, the nitrogen source used to promote the growth of the floating aquatic species is comprised of animal waste, such as cow dung or pig waste and the like. In other embodiments, the nitrogen source is urea. In still other embodiments, the nitrogen source is biogas plant slurry. The reactor can be fitted with heating elements and/or a cooling system in order to regulate the temperature of the growing plants. In some embodiments, the reactor is surrounded by wind shields to prevent or reduce compacting of the floating plants that can be caused by wind. The wind shields can be permeable to light necessary for the growth of floating aquatic species.

In some embodiments, the reactor supporting the growth of the floating aquatic species is physically divided into discrete sections, such that individual growth cells are created. In certain embodiments, the material forming the reactor divisions is metal, plastic, rubber, or combinations thereof. For example, a network of floating baffles can interfere with the free flow of floating plants to avoid compacting/piling caused by wind and maintain uniform distribution of the plants across the surface of the culture medium. Uniform density of cultured plants can increase the productivity of the reactor due to increased light received by the culture, and more effective nutrient distribution to and waste removal from the culture. Uniform density of cultured plants can increase the accuracy of culture density measurements.

The harvested biomass comprising the aquatic species can be processed into two components: a carbohydrate-rich solid phase and a protein-rich liquid phase, also referred to as a juice. The process can be achieved using a screw press, a belt press, a knife mill, or the like, or a combination thereof. Merely by way of example, the harvested biomass can be lysed in a knife mill. As used herein, "lysing" biomass encompasses mechanical or chemical processes that disturb the organization of the organism on the level of individual cells or multicellular structures, so as to render the carbohydrates, proteins, and micronutrients present in the biomass organisms more available for downstream processing to purified protein, carbohydrate containing materials, or micronutrient-containing fluids. Lysing can include, for example, chopping, shredding, smashing, pressing, tearing, lysis by osmotic pressure, or chemical treatments that degrade biological structures. The lysed biomass can be pressed in a belt press to generate a juice and a first solid phase; and the first solid phase can be pressed in a screw press to generate more juice and a wet material, referred to as "bio-crude." The wet bio-crude can comprise the carbohydrate-rich solid phase, and can be processed further. The juice generated in different pressing procedures can be combined for further processing.

The wet bio-crude may be processed based on considerations, such as, for example, suitability for further applications. Merely by way of example, the bio-crude can be dried to be used as a power plant feedstock. In other embodiments, the bio-crude can be optimized via pelletization or the like for co-combustion with other hydrocarbon-based fuels, such as coal. In other embodiments, the bio-crude is used as a feedstock for biofuel conversion. In other embodiments, the bio-crude is further processed using physical or chemical methods to further extract protein content.

This application incorporates by reference U.S. application Ser. No. 13/265,525, filed on Feb. 6, 2012, which is a national stage entry of PCT/US10/31811, filed on Apr. 20, 2010, which claims priority to U.S. Provisional Patent Application No. 61/171,036, filed on Apr. 20, 2009, all of which are hereby incorporated by reference herein for all purposes.

As will be understood by those skilled in the art who have the benefit of the instant disclosure, other equivalent or alternative compositions, devices, methods, and systems for fluid conveyance in a continuous loop can be envisioned without departing from the description contained herein. Accordingly, the manner of carrying out the disclosure as shown and described is to be construed as illustrative only.

Persons skilled in the art may make various changes in the shape, size, number, separation characteristic, and/or arrangement of parts without departing from the scope of the instant disclosure. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. Where desired, some embodiments of the disclosure may be practiced to the exclusion of other embodiments. Where the verb "may" appears, it is intended to convey an optional and/or permissive condition, but its use is not intended to suggest any lack of operability unless otherwise indicated. Where open terms such as "having" or "comprising" are used, one of ordinary skill in the art having the benefit of the instant disclosure will appreciate that the disclosed features or steps optionally may be combined with additional features or steps. Such option may not be exercised and, indeed, in some embodiments, disclosed systems, compositions, apparatuses, and/or methods may exclude any other features or steps beyond those disclosed herein. Elements, compositions, devices, systems, methods, and method steps not recited may be included or excluded as desired or required. Persons skilled in the art may make various changes in methods of preparing and using a composition, device, and/or system of the disclosure.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/− about 10%, depicted value +/+ about 50%, depicted value +/+ about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

All or a portion of a device and/or system for fluid conveyance in a continuous loop may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Some specific example embodiments of the disclosure may be illustrated by one or more of the examples provided herein. The following non-limiting examples are provided to further illustrate embodiments of the present application. It should be appreciated by those of skill in the art that the techniques disclosed in the examples that follow represent approaches discovered by the inventors to function well in the practice of the application, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the application.

Example 1

FIG. 1 shows an exemplary system for culturing an aquatic species. The system comprises a container defined by a berm 2, on which are mounted windbreaks 3. The container comprises a The system can include a water source which can provide water as the culture medium, a nutrition system ("nutrient and bicarbonate station" in FIG. 1) which can provide at least one nutrient to the system, and a harvest system 5 within a harvest channel 4, in which the aquatic species is harvested. The harvested aquatic species can be transported to a processing center for further processing. A propulsion system 9 is disposed within the container, and floating windbreak 10. The system can also include sprinklers 1 (shown as solid dots) evenly distributed in a 4 by 4 matrix in the system, and a monitoring system 6 for monitoring levels of nutrients, pH, and temperature. Turning vanes 7 are placed within the curved portions of the container. The system can further include a drain and overflow system 8 (shown as the two open dots on the right). The system can include a single raceway growth systems which is about 2.5 ha. The system can culture Lemna.

Example 2

Figure 2:
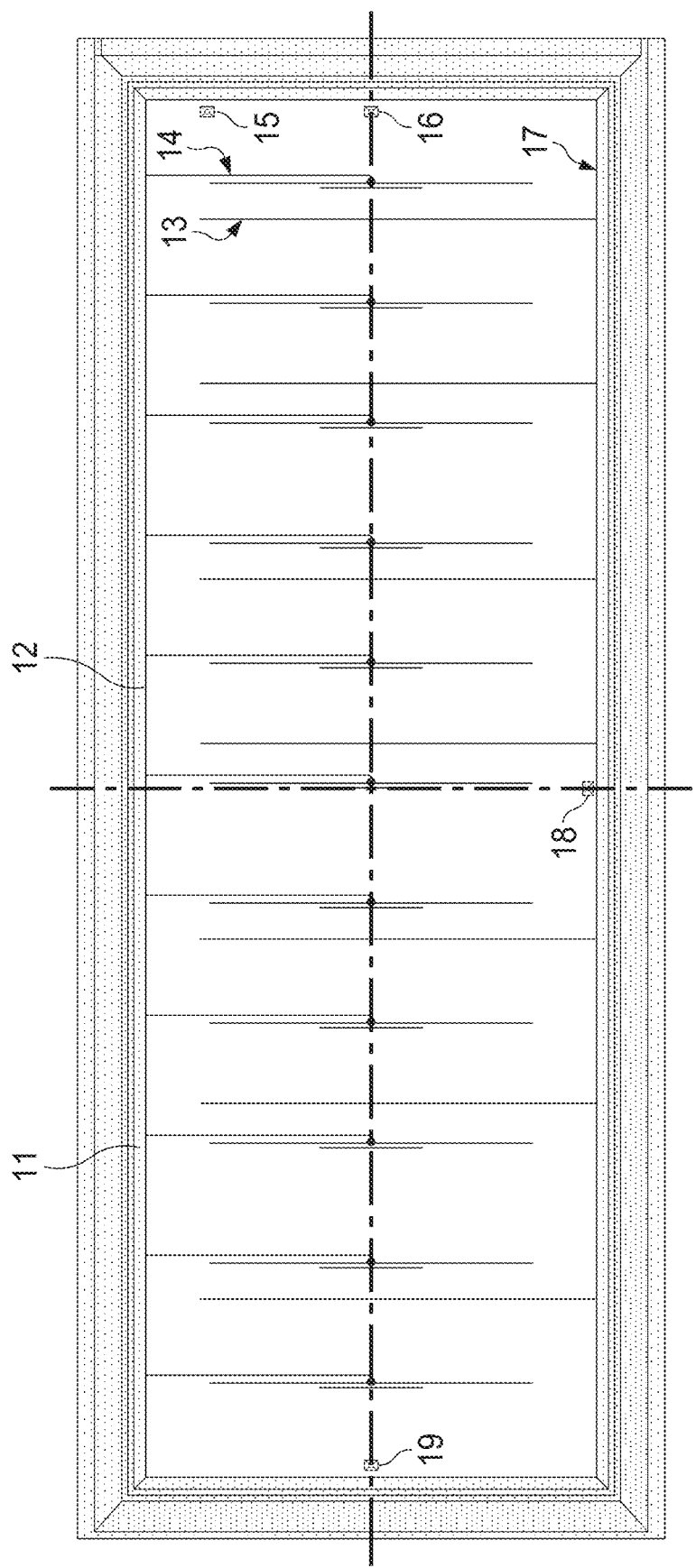
FIG. 2 illustrates a perspective view of a floating grid system according to specific example embodiments of the disclosure.

FIG. 2 shows an exemplary static system for culturing an aquatic species. The system can include support augers 11. In the exemplary system, there are thirty-four support augers. Harvest branches 14 are attached to the support auger. In the particular configuration disclosed, there are eleven harvest branches distributed in the system. The mixture of the aquatic species and the culture medium can be harvested through the harvest branches 14 and then supplied to the harvest header 12 in a controlled fashion. Harvest header 12 comprises a 6-inch PVC pipe in this embodiment. After the culture medium is separated from the harvested aquatic species, the culture medium can be delivered back to the system through a return header 17, likewise comprising a 6-inch PVC pipe, and then return branches 13. In the exemplary system, there are seven return branches in the system. The system can include one or more drain sumps 15, 16, 18, 19 for recirculating the culture medium. The dimensions or the quantity of a specific part of the system in the figure is for purposes of illustrating a particular embodiment, and is not intended to limit the scope of the application. A person of ordinary skill in the art would know that the dimensions or the quantity of a specific part of the system can be modified.

Example 3

Figure 3:
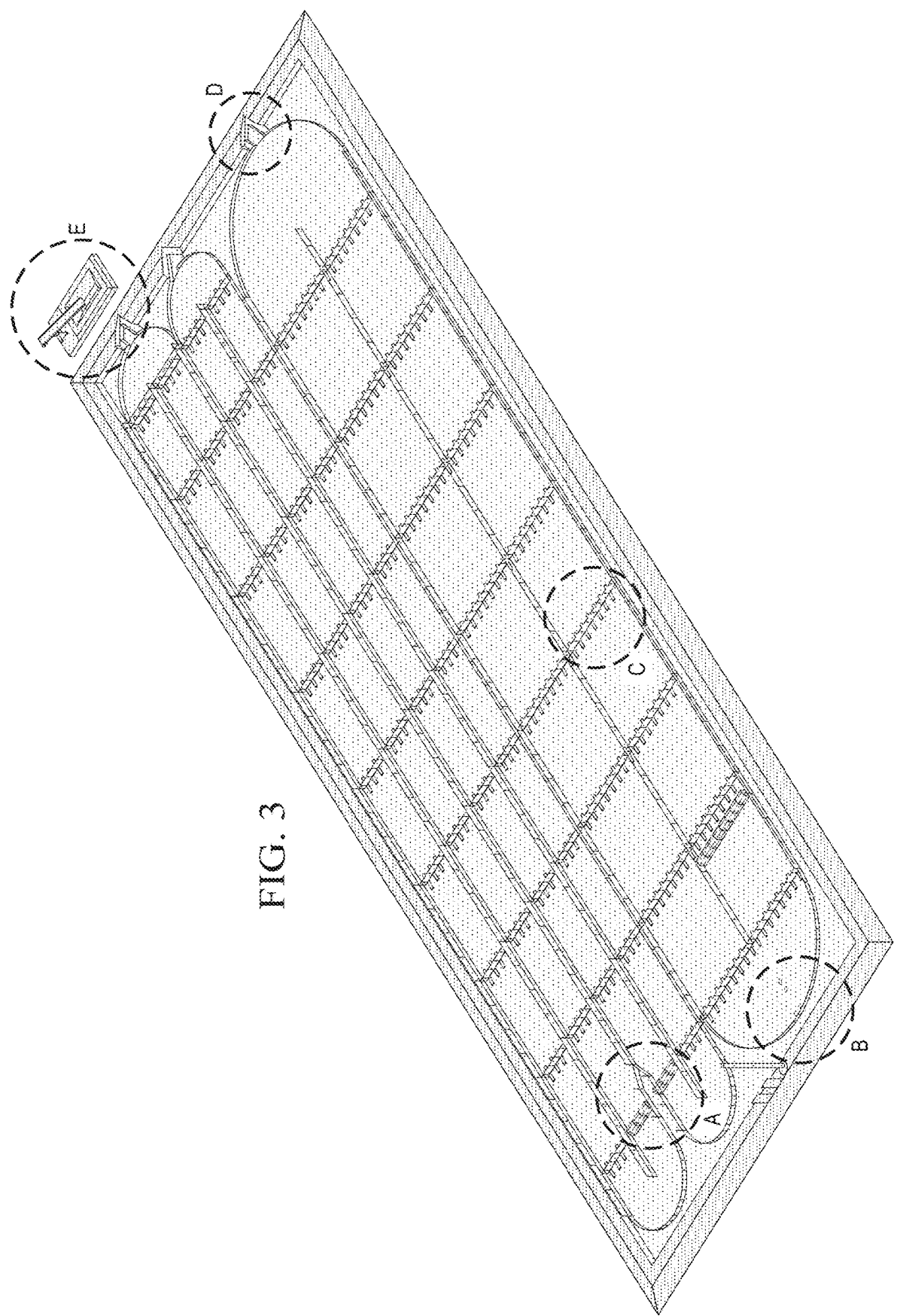
FIG. 3 illustrates a perspective view of a raceway growth system according to specific example embodiments of the disclosure.

In an alternate embodiment of a raceway system, the individual raceways have an elliptical or circular configuration. FIG. 3 illustrates such a configuration, in which three such raceways are placed in a side-by-side configuration. Other embodiments are also contemplated in which a single elliptical raceway is employed, or in which two mirror-image raceways are employed. As can be seen in the figure, this raceway system comprises wind barriers that are situated on the walls or berms making up the raceways, as well as floating wind barriers.

Figure 4:
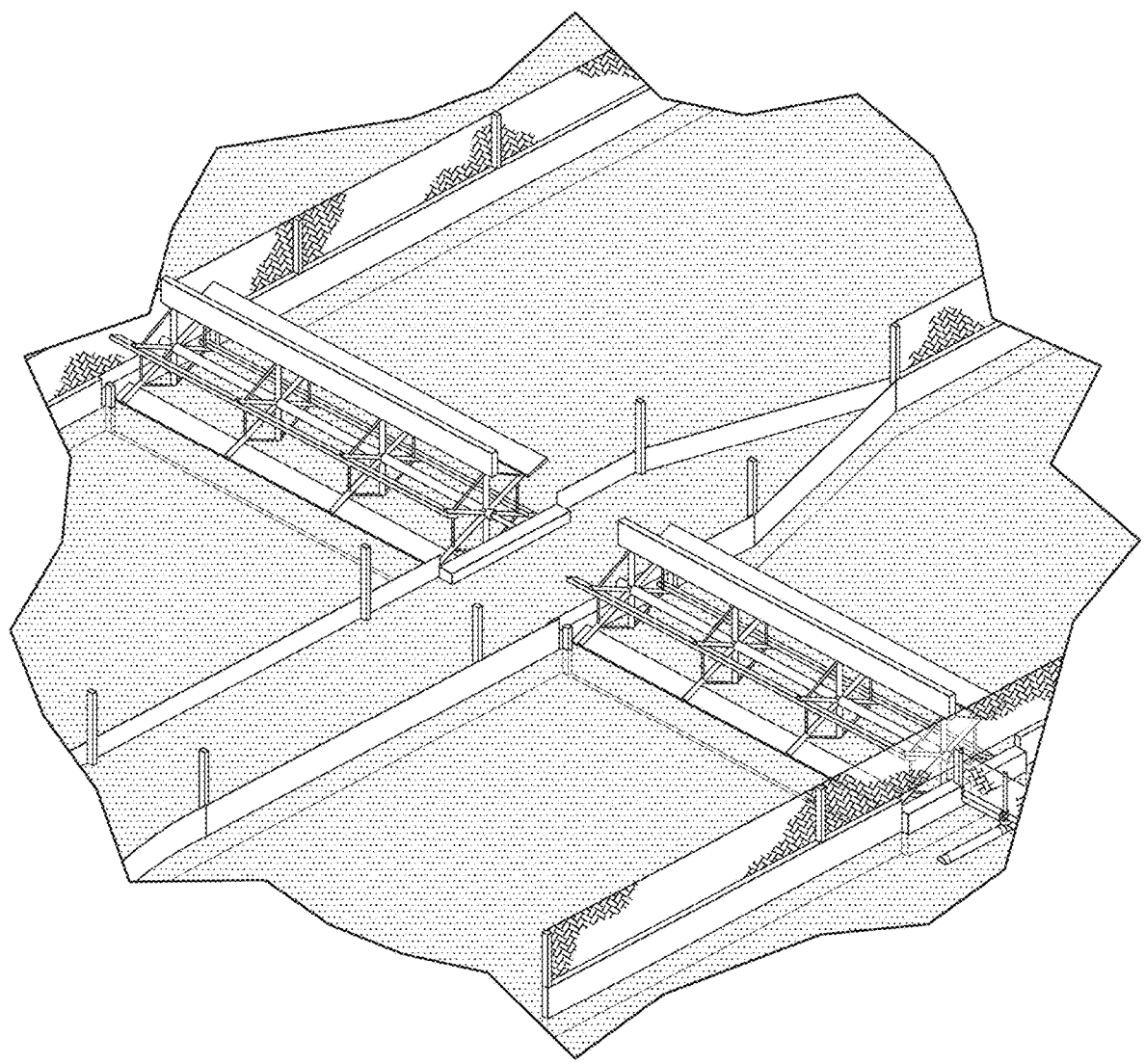
FIG. 4 illustrates a perspective view of paddlewheels and support platforms according to specific example embodiments of the disclosure.
Figure 5:
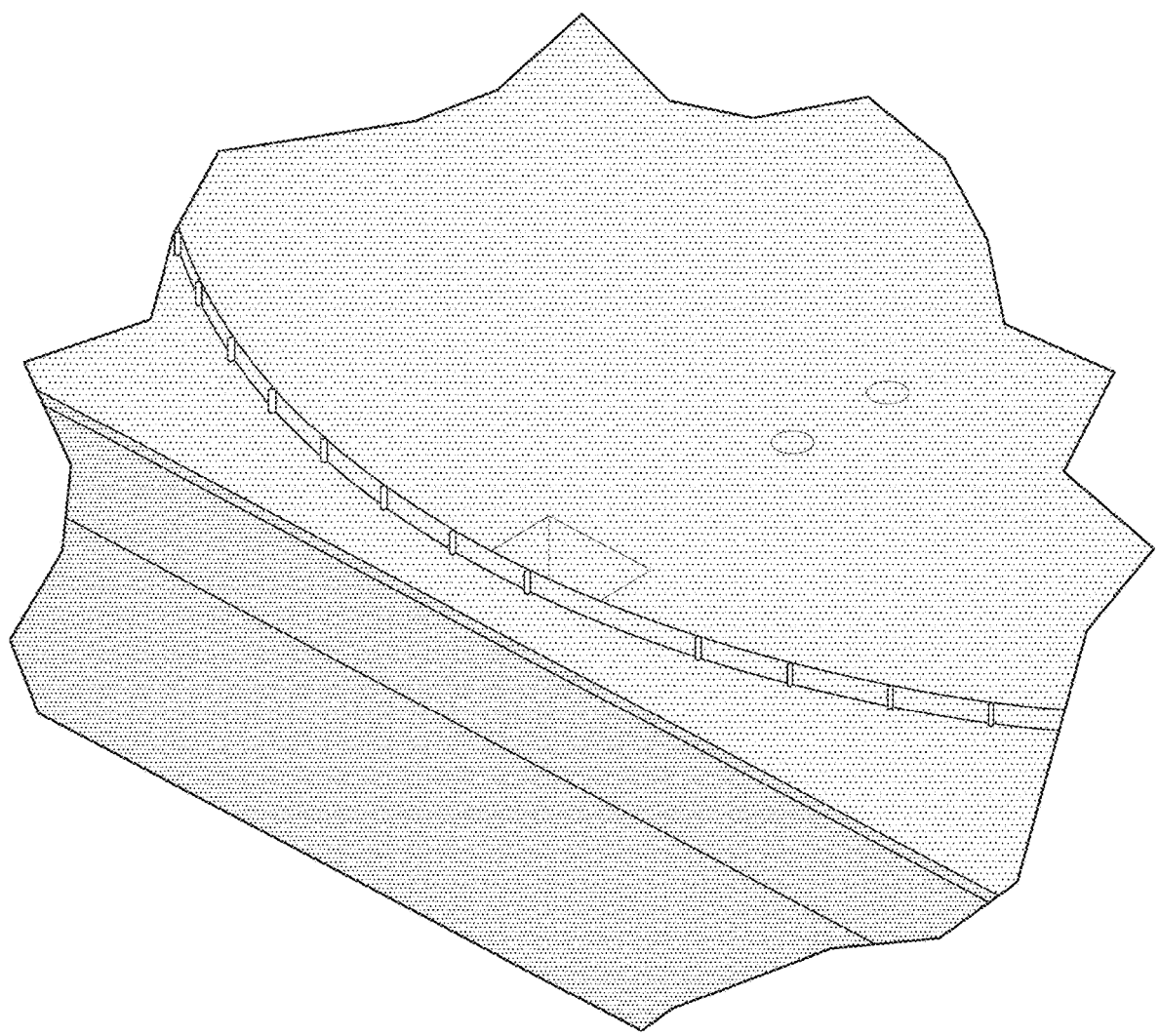
FIG. 5 illustrates a perspective view of drain sumps according to specific example embodiments of the disclosure.
Figure 6:
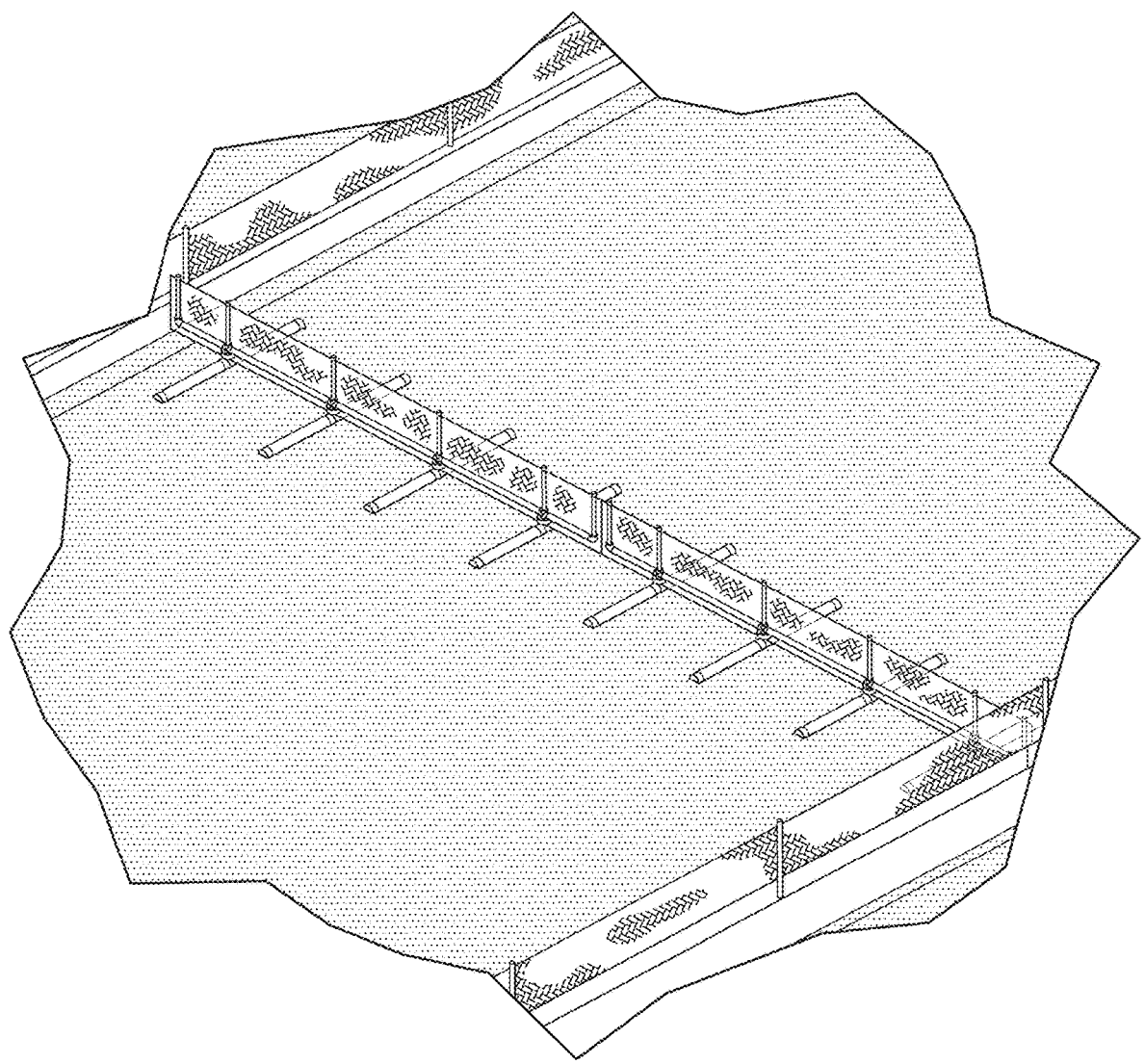
FIG. 6 illustrates a perspective view of floating windbreaks according to specific example embodiments of the disclosure.
Figure 7:
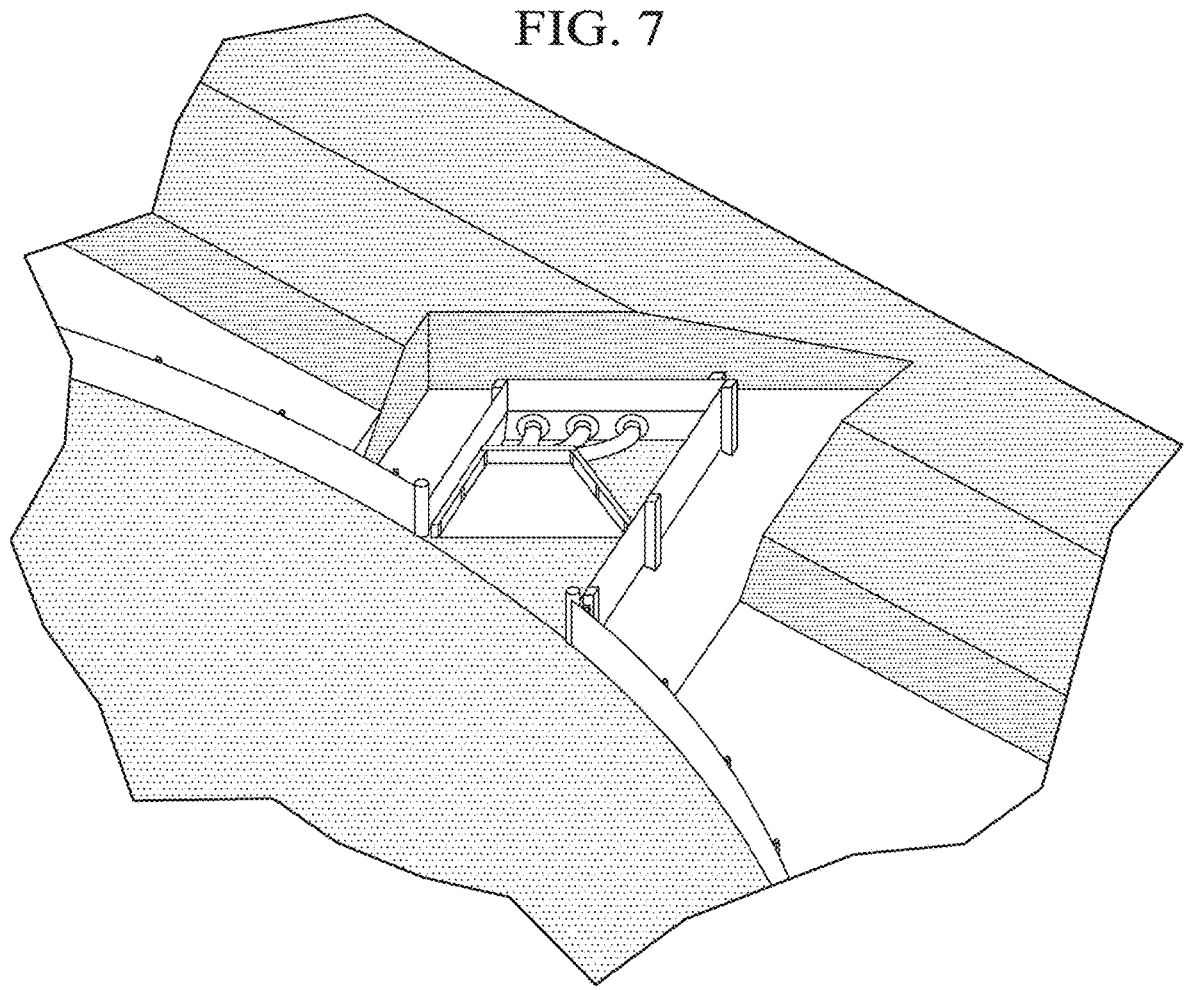
FIG. 7 illustrates a perspective view of a floating harvesting skimmer according to specific example embodiments of the disclosure.
Figure 8:
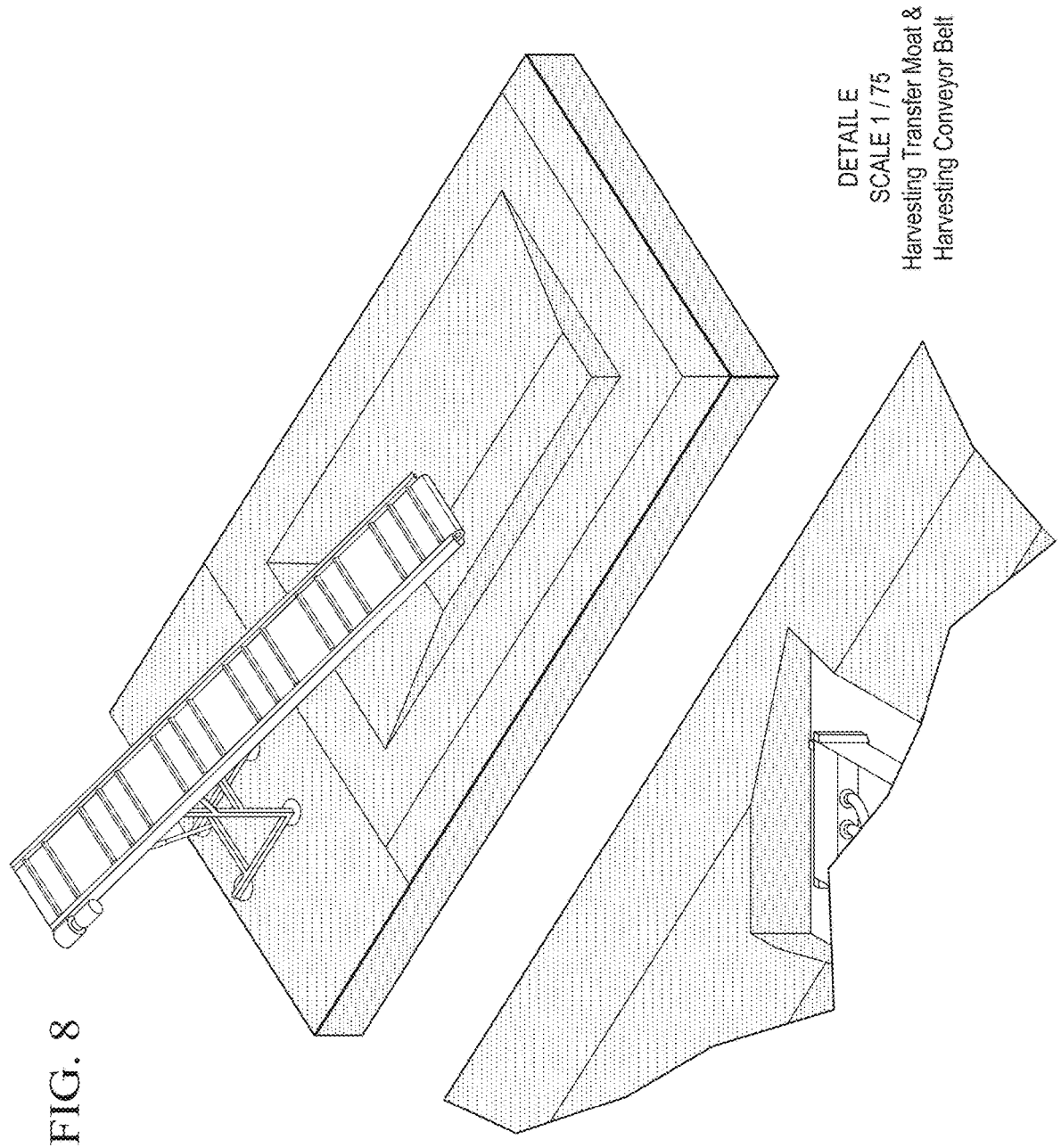
FIG. 8 illustrates a perspective view of a harvesting transfer moat and harvesting conveyor belt according to specific example embodiments of the disclosure.

Particular features of the raceway system of this embodiment, marked with letters A-E in FIG. 3, are depicted in greater detail in FIGS. 4-8. FIG. 4 depicts the paddlewheels and support platforms. The support platforms have a concave top surface matching the curvature of the blades of the paddlewheel to more efficiently develop force. FIG. 5 depicts the drain sumps, which are similar tom those depicted in FIG. 2. FIG. 6 shows the floating windbreaks in greater detail. FIG. 7 shows the details of the floating harvesting skimmer, which in this embodiment has access to the lemna or other aquatic species via a break in the wall forming the raceway. FIG. 8 shows the conveyor belt-based harvesting system.

Figure 9:
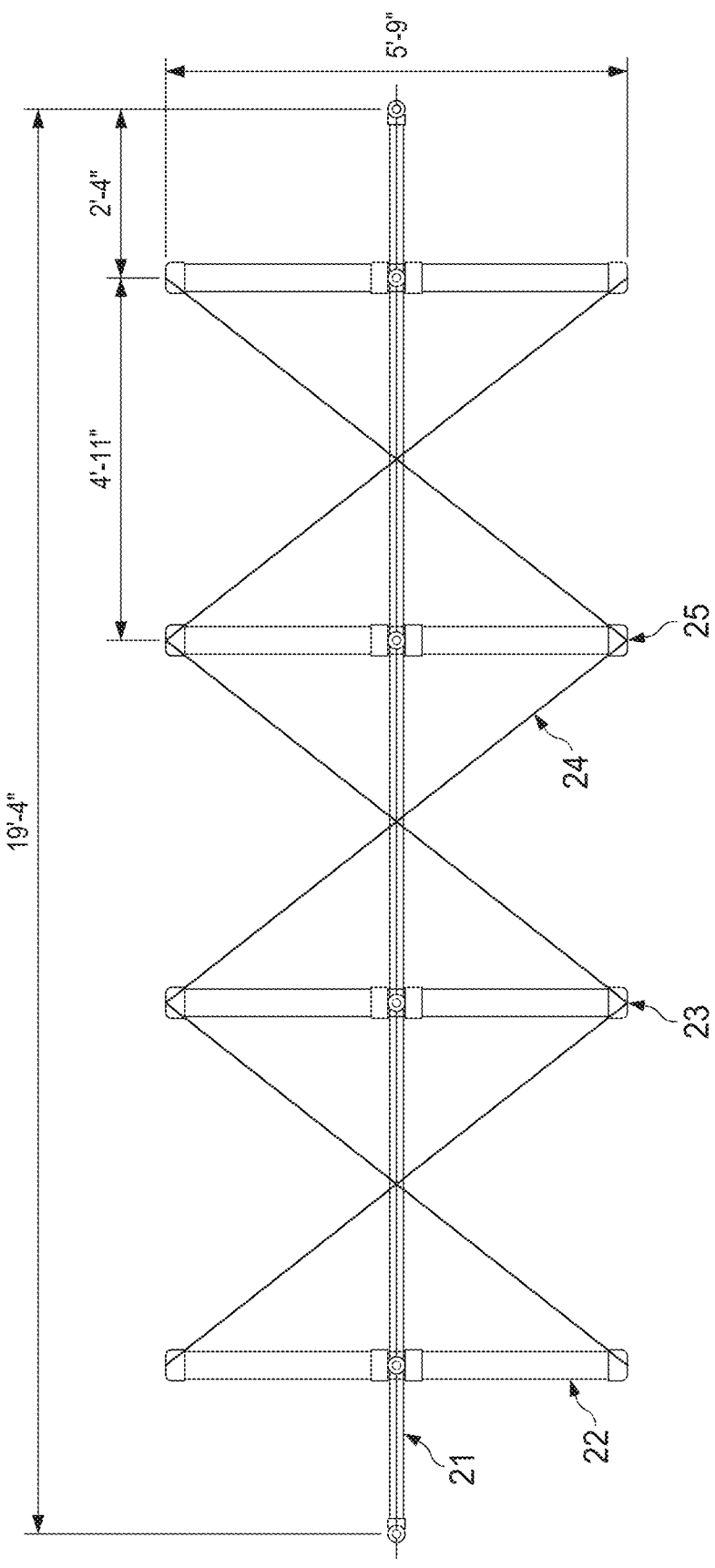
FIG. 9 illustrates a perspective view of a windbreak structure according to specific example embodiments of the disclosure.

FIG. 9 is a top view of an exemplary windbreak structure. The exemplary structure comprises 2" SCH PVC pipes 21; 4" SCH PVC pipes 22; 23 indicating that the windbreak structure can float on the culture medium, e.g. water; galvanized support wires 24; and eyebolt attachments 25 indicating that support wires 24 are affixed to the eyebolts on top of the PVC pipes 22. Support wire 24 can comprise a .041" solid core. The support wire 24 can sustain the lateral load to the windbreak structure generated by, e.g., wind. The eyebolt attachments 25 may not compromise the float seal.

Figure 10:
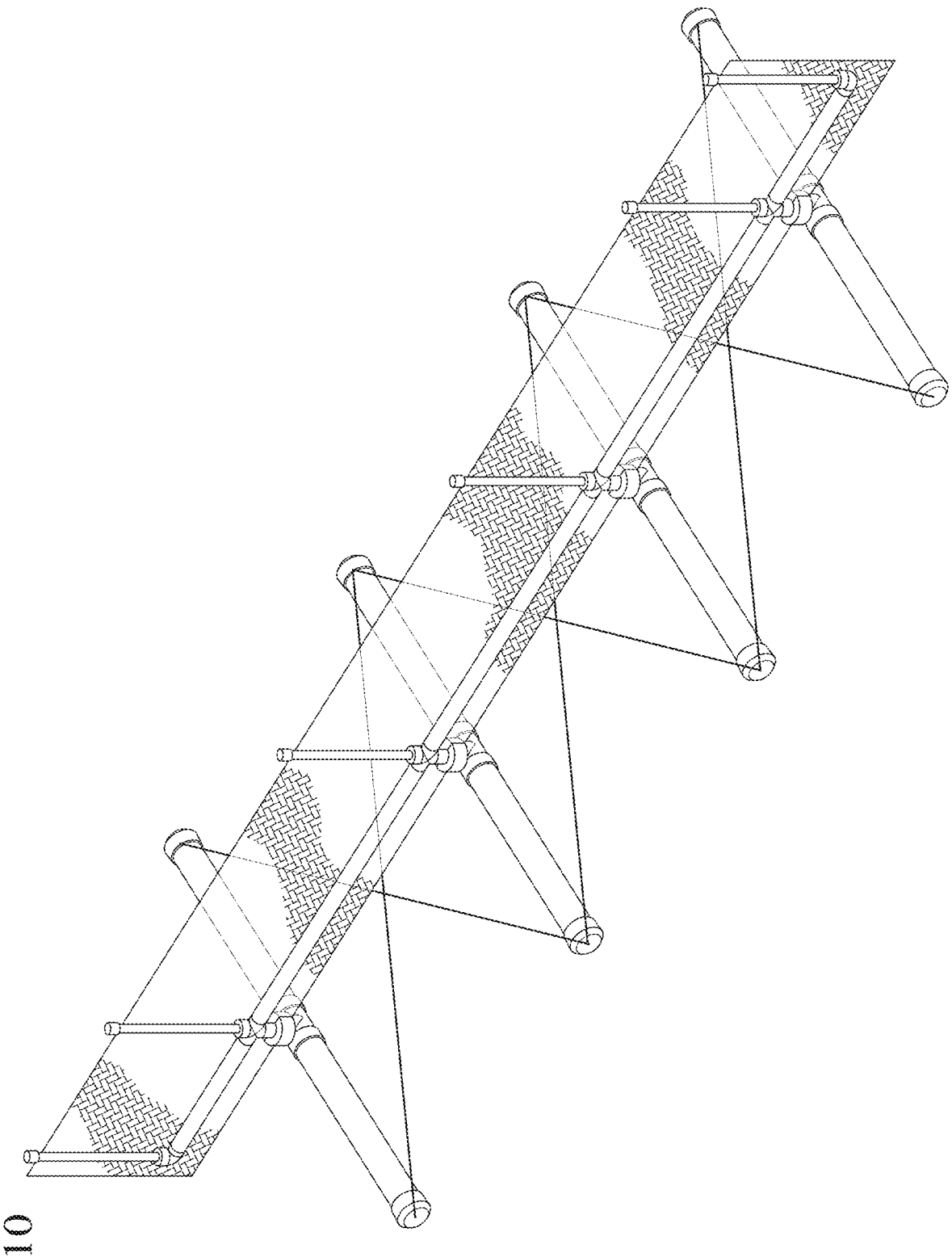
FIG. 10 illustrates a perspective view of a windbreak structure according to specific example embodiments of the disclosure.

FIG. 10 is a perspective view of the exemplary windbreak structure shown in FIG. 9. The vertical pipes affixed to the PVC pipes (21 of FIG. 9) are 1" SCH 40 PVC pipes. The windbreak structure can further comprise a curtain affixed to at least one of the PVC pipes including 21 of FIG. 9, 22 of FIG. 9, or the vertical 1" SCH 40 PVC pipes. For example, the curtain can be bolted to the vertical 1" SCH 40 PVC pipes. The curtain can be overhung to existing walls, e.g. walls of the container. The curtain can be essentially rectangular.

What is claimed is:

1. A method of culturing an aquatic species, the method comprising:
   introducing the aquatic species into a receptacle comprising: (a) a culture medium, (b) at least one raceway configured to allow the culture medium to flow in a continuous loop, and (c) a sufficient quantity of the culture medium to flow in the continuous loop;
   cultivating the aquatic species to generate a floating mat on a top surface of the culture medium;
   generating a fluid current of sufficient force to propel the floating mat on the top surface of the culture medium; and
   varying a velocity of the fluid current in a controlled manner to maintain a relatively uniform distribution of the floating mat on the top surface of the culture medium.

2. The method of claim 1, wherein the fluid current is generated by a propulsion mechanism, and
   wherein the propulsion mechanism is selected from a paddle wheel and a fluid pump.

3. The method of claim 1, further comprising harvesting the aquatic species with a harvest system.

4. The method of claim 3, wherein the harvest system comprises at least one of: a conveyer belt and a surface skimmer.

5. The method of claim 3, wherein harvesting the aquatic species with the harvest system further comprises:
   coupling the harvest system to a propulsion system, wherein: (a) the harvest system comprises a conveyer belt and a harvest channel wall, (b) the propulsion system comprises a paddle wheel, and (c) the harvest channel wall is coupled to the paddle wheel;
   generating a channel between the paddle wheel and the conveyor belt, wherein the harvest channel wall is configured to extend from the paddle wheel in a manner such that the channel is generated between the paddle wheel and the conveyor belt; and
   directing at least a portion of the floating mat to the conveyor belt through the channel.

6. The method of claim 1, further comprising monitoring at least one of: (a) a uniformity of distribution of the floating mat across the top surface of the culture medium, (b) a thickness of the floating mat (c) a density of the floating mat, (d) a pH of the culture medium, (e) a concentration of carbon dioxide in the culture medium, and (f) a concentration of one or more nutrients in the culture medium.

7. The method of claim 6, wherein the monitoring is performed by a sensor and the method further comprises:
   collecting a data point about a monitored metric;
   generating a sensor signal comprising the data point; and
   transmitting the sensor signal.

8. The method of claim 7, the method further comprising:
   receiving the sensor signal at a control mechanism, wherein the control mechanism is operatively linked to the sensor and at least one a regulator, wherein the regulator comprises at least one of:
      a propulsion mechanism, configured to generate a fluid current with a velocity;
      a harvest system, configured to harvest the aquatic species;
      a sprinkler system; and
      an additive source;
   determining, in response to the received sensor signal, if a threshold level of a monitored metric is reached;
   generating a regulation signal in response to the threshold level of the monitored metric being reached; and
   transmitting the regulation signal.

9. The method of claim 8, the method further comprising:
   receiving the regulation signal at the regulator; and
   performing a regulatory function at the regulator in response to the regulation signal.

10. The method of claim 9, wherein the regulator comprises the propulsion mechanism and the regulatory function comprises changing the velocity of the fluid current.

11. The method of claim 10, wherein the velocity of the fluid current is regulated such that the floating mat on the top surface of the culture medium is propelled at a speed of at least 0.01 m/s.

12. The method of claim 10, wherein the velocity of the fluid current is regulated such that the floating mat on the top surface of the culture medium is propelled at a speed of between 0.01 m/s and 0.10 m/s.

13. The method of claim 9, wherein the regulator comprises the harvesting system and the regulatory function comprises activating the harvest system.

14. The method of claim 9, wherein:
   the regulator comprises the additive source, configured to be in fluid communication with at least one of: (a) the receptacle and (b) the sprinkler system, and comprising at least one of: (a) a nutrient tank and (b) a source of an alkaline salt; and
   the regulatory function comprises dispensing at least one of: nitrogen, phosphorous, potassium, carbon dioxide, a micronutrient, and an alkaline salt.

15. The method of claim 1, further comprising adding a wind barrier, wherein the wind barrier is configured to reduce a wind force applied to the floating mat on the top surface of the culture medium by an atmospheric wind.

16. The method of claim 15, wherein the wind barrier is further configured for at least one of: (a) mounting to a peripheral wall of the receptacle and (b) floating in the receptacle.

17. The method of claim 16, wherein the wind barrier comprises at least one of: (a) a mesh curtain having a height of about 50 cm to 100 cm and (b) a mesh curtain comprising knitted plastic.

18. The method of claim 17, wherein the knitted plastic comprises about 50% porosity openings.

19. The method of claim 1, further comprising applying a mist across the width of the receptacle.

* * * * *